United States Patent [19]
Ellis

[11] 3,974,760
[45] Aug. 17, 1976

[54] COOKING APPARATUS
[76] Inventor: Clarence Eugene Ellis, 724 Monument Road, Ponca City, Okla. 74601
[22] Filed: May 12, 1975
[21] Appl. No.: 576,809

[52] U.S. Cl. ............................... 99/482; 126/25 A
[51] Int. Cl.² ............................................ A23B 4/04
[58] Field of Search ................... 99/482, 448, 450; 126/25 R, 25 A

[56] References Cited
UNITED STATES PATENTS

| | | | |
|---|---|---|---|
| 1,694,211 | 12/1928 | Fernandez | 126/25 A X |
| 2,552,861 | 5/1951 | Overman | 126/25 R |
| 3,699,876 | 10/1972 | Ellis | 126/25 R X |
| 3,776,127 | 12/1973 | Muse | 99/482 |
| 3,841,211 | 10/1974 | Ellis | 99/482 |

Primary Examiner—Philip R. Coe
Attorney, Agent, or Firm—Lawrence L. Colbert

[57] ABSTRACT

In a pit-type slow cooking apparatus, smoldering fuel elements are held on a substantially balanced seesaw support near and above a heating element in the bottom of the pit or enclosure. Food is supported at elevations above the smoldering solid fuel. As the fuel is slowly consumed without open burning or flaming, seesaw movement of the fuel support affords alternate cooling and heat exposure periods for the solid fuel to promote slower and more controllable burning.

10 Claims, 4 Drawing Figures

U.S. Patent  Aug. 17, 1976  3,974,760
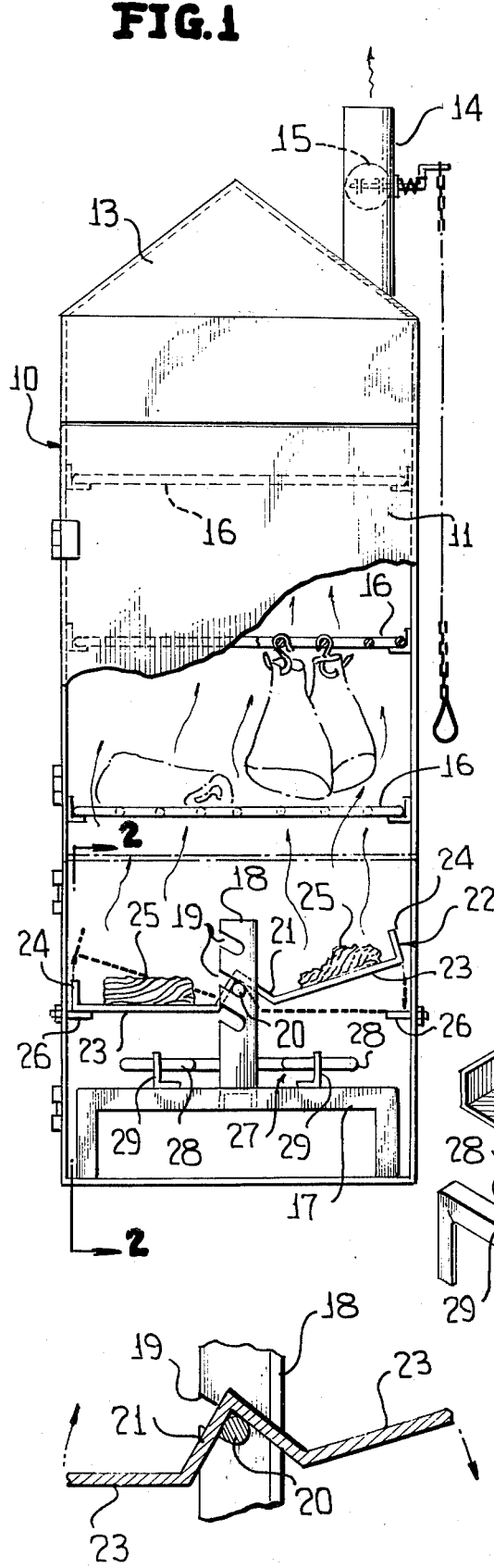
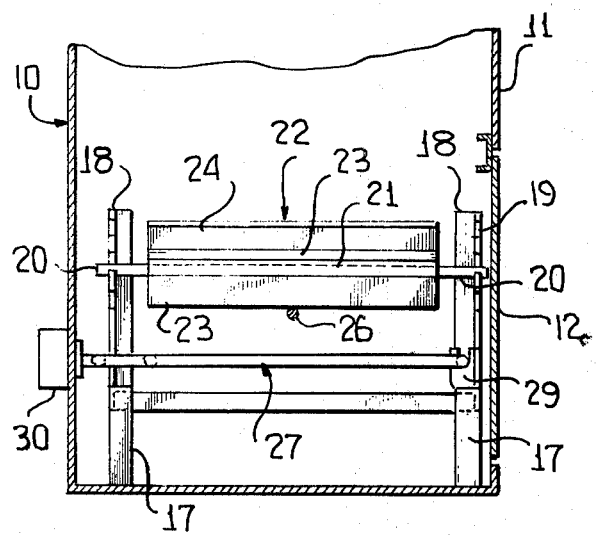
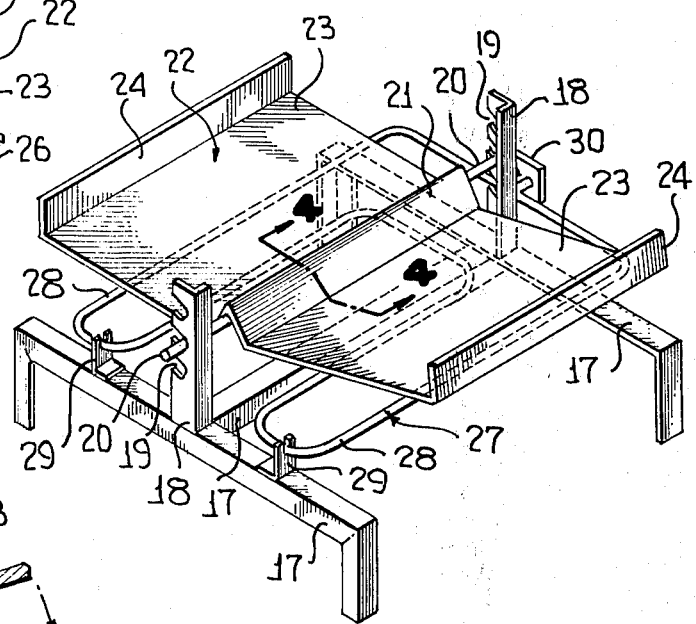

COOKING APPARATUS

BACKGROUND OF THE INVENTION

The invention constitutes an improvement on the prior art relating to pit cooking and smoking apparatus, and more particularly is an improvement on the apparatus shown in U.S. Pat. No. 3,841,211 to Ellis. In the Ellis patent, smoldering hickory wood or equivalent solid fuel is supported on a tray or pan near and above an electrical heating element in the bottom portion of a cooking pit or enclosure. The food is supported well above the smoldering fuel on a rack in the upper region of the pit. The fuel tray in the patient is bodily supported on bimetallic legs which expand and contract to move the tray and solid fuel cyclically toward and away from the fixed underlying electrical heating element. This, in turn, automatically regulates the burning of the wood fuel and the emission of smoke and avoids the fuel bursting into an open flame, which is undesirable.

The present invention improves on the mode of operation in the Ellis patent and renders the apparatus more reliable and efficient and more economical to construct. The necessity for the bimetal support elements in the patent is dispensed with in this invention by the provision of a balanced "seesaw" fuel support near and above the heating element adapted to hold roughly balanced wood fuel pieces on opposite sides of a fulcrum. This results in a new mode of operation where the fuel components on opposite sides of the fulcrum are alternately subjected to heating and cooling periods, making the burning slower and more controllable than in the prior art.

Other features and advantages of the invention will become apparent during the course of the following description.

BRIEF DESCRIPTION OF DRAWING FIGURES -

FIG. 1 is a side elevation, partly broken away, of a cooking and smoking apparatus embodying the invention.

FIG. 2 is a fragmentary vertical section taken on line 2—2 of FIG. 1.

FIG. 3 is a perspective view of a balanced pivotally mounted fuel supporting tray and adjacent heating element embodied in the apparatus.

FIG. 4 is an enlarged fragmentary vertical section taken on line 4—4 of FIG. 3.

DETAILED DESCRIPTION

Referring to the drawings in detail, the numeral 10 designates a vertically elongated rectangular cross section housing provided on one side thereof with access doors 11 and 12 adjacent to the food cooking chamber and fuel burning chamber of the apparatus, respectively. The top of the housing 10 is substantially closed by a hood 13 having a chimney 14 near one side thereof and said chimney provided with a manually controllable damper 15.

The housing 10 contains vertically spaced food supporting racks 16 in its upper chamber portion adjacent the access door 11, and various food articles to be cooked and smoked can be supported on one or more of these racks at desired elevations, as shown in FIG. 1. The number and spacing of the racks may be varied according to the invention.

In a bottom chamber of the housing, adjacent the lower access door 12, solid fuel supporting and heating means forming important elements of the invention are disposed. This means is shown separately in FIG. 3 and comprises a pair of spaced inverted U-shaped leg units 17 which rest upon the base of pit or housing 10, FIG. 1. At their centers, a pair of upstanding vertical posts 18 are fixedly secured to the leg units 17 and project thereabove for equal distances in the housing 10. Each post 18 has a series of vertically spaced support notches 19 formed therein for the rockable support of a horizontal shaft or axle 20 which is secured by welding or the like to the underside of a V-shaped center rib 21 formed in a balanced symmetrical fuel supporting-'seesaw" tray 22. The tray 22, when empty, may be substantially accurately balanced so that it will assume a neutral balanced position through its suspension shaft 20 with respect to posts 18. The tray 22 includes opposite side fuel supporting panels 23 preferably having outer end upturned flanges 24. Solid fuel components 25, such as hickory wood sections of roughly equal weight before burning, are placed on the panels 23, as shown in FIG. 1, during the operation of the apparatus.

Stop pin elements 26 are preferably secured to opposing side walls of the housing 10 to positively limit the tilting or seesaw action of tray 22, as indicated in FIG. 1.

Beneath the fuel supporting tray 22 and arranged at a fixed elevation in a horizontal plane is an electrical heating element 27, such as a conventional Calrod element, having conventional controls not shown. The element 27 is preferably formed in two horizontal loops 28 which underlie the panels 23 of the rockable balanced fuel tray 22. The loops 28 are stabilized by rests 29 provided on one of the leg units 17, as shown. The electrical terminals of the element 27 are disposed exteriorly of the housing 10 as indicated at 30 in the drawings.

In the operation of the apparatus, food is supported in the desired manner on one or more of the racks 16 in the upper cooking chamber. The balanced rockable tray 22 is mounted at the preferred elevation on the posts 18 relative to fixed heating element 27 and approximately equal size pieces of hickory wood or similar solid fuel pieces 25 are placed on the tray panels 23, and the heating element is turned on.

The heavier of the two fuel pieces 25 will cause one side of the balanced tray 22 to be lowered into contact with a stop 26 and the other side of the tray with its fuel piece is simultaneously elevated and positioned a greater distance away from heating element 27. As a consequence, the lowermost fuel piece 25 will be subjected to a period of slow burning or smoldering caused by its proximity to the heating element, and smoke, as well as heat from this smoldering fuel, will pass upwardly through the enclosure 10 and cooking chamber to slowly cook and smoke the food to a delicate flavor. The release of smoke from the enclosure may be regulated by the damper 15.

When the lowered fuel element 25 is gradually consumed by slow burning, its weight will lessen and the component 25 on the elevated side of the tray 22 which is in a cooling mode without substantial burning or with only very slow smoldering will eventually become heavier than the lowered fuel piece, and therefore the tray 22 will rock on its fulcrum through the axis of shaft 20, and the elevated fuel 25 will then shift toward the heating element 27 as the previously lowered fuel becomes elevated and begins a relative cooling period. This cycle of operation will continue without any external assistance until the fuel on both tray panels 23 is gradually consumed by slow burning and smoking, and without bursting into open flame. The cyclical seesaw action of tray 22 will occur solely in response to a gradual consumption by burning of the two fuel pieces 25 as they are cyclically lowered and elevated relative to the element 27 to be subjected alternately to heating and cooling periods. Each such cyclic operation will change the balance of the tray 22, as explained, without any external force being applied thereto and without employing thermal expansion or contraction as with a bimetal arrangement.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A cooking apparatus comprising a housing having a smoke outlet, an upper chamber in said housing having food supporting means therein, a lower chamber of said housing having solid fuel slow burning means therein, said solid fuel slow burning means comprising a substantially balanced workable fuel support tray in said lower chamber, a horizontal axis fulcrum on which said support tray rests, and a heating element positioned below said tray at a fixed elevation in said lower chamber.

2. A cooking apparatus as defined by claim 1, and a leg support structure forsaid rockable tray at the bottom of said housing, said rockable tray including a rocker shaft rockably mounted on said leg support structure at said fulcrum.

3. A cooking apparatus as defined by claim 2, and said leg support structure including a pair of upstanding posts each having vertically spaced notches for the selective supporting of said rocker shaft at different elevations relative to the heating element.

4. A cooking apparatus as defined by claim 3, and a pair of stop elements on said housing adjacent said rockable tray to limit the extent of rocking thereof in opposite directions.

5. A cooking apparatus as defined by claim 1, and said heating element comprising an electrical heating element disposed in a horizontal plane below said rockable tray.

6. A cooking apparatus as defined by claim 5, and said rockable tray including a rocker support shaft at said fulcrum, and panel portions of said tray onopposite sides of said shaft being convergent downwardly and toward the center of the tray on shallow angles to the horizontal, said tray being symmetrical about the axis of said shaft.

7. A cooking apparatus as defined by claim 6, and a pair of limit stops in the path of movement of the tray and mounted on opposite side walls of the housing.

8. A cooking apparatus as defined by claim 1, and said food support means comprising vertically spaced racks in said upper chamber of the housing.

9. A cooking apparatus as defined by claim 1, and a supporting structure for said rockable fuel support tray at the bottom of said housing and below the heating element including spaced upstanding posts having rocker bearing parts for said tray.

10. A cooking apparatus as defined by claim 9, and said support structure including rest elements for the support of said heating element, said element being an electrical heating element.

* * * * *